United States Patent [19]

Deubner et al.

[11] 4,330,354

[45] May 18, 1982

[54] APPARATUS FOR MONITORING DISPENSATION OF GLUE IN AN AUTOMATIC GLUEING MACHINE

[75] Inventors: Joachim Deubner, Oberasbach; Franz Zeh, Nuremberg, both of Fed. Rep. of Germany

[73] Assignee: Triumph-Werke Nurnberg A.G., Nuremberg, Fed. Rep. of Germany

[21] Appl. No.: 136,873

[22] Filed: Apr. 3, 1980

[30] Foreign Application Priority Data

Apr. 12, 1979 [DE] Fed. Rep. of Germany ....... 2915006

[51] Int. Cl.$^3$ ............................................. B32B 31/00
[52] U.S. Cl. .................................. 156/352; 118/688; 118/712; 118/410; 156/356; 156/368
[58] Field of Search ............... 118/665, 712, 688, 410; 156/352, 356, 368

[56] References Cited

U.S. PATENT DOCUMENTS

| 2,787,240 | 4/1957 | Geersten | 118/665 |
| 2,989,422 | 6/1961 | Helbing | 118/407 X |
| 3,943,527 | 3/1976 | Hartmann | 118/410 X |

*Primary Examiner*—John P. McIntosh

[57] ABSTRACT

The invention relates to a monitoring device for automatic gluing machines, particularly for gluing metal parts. When no glue has been fed the automatic changing of a turntable, for example, supporting workpieces to be glued, is interrupted. This is accomplished by means of a probe disposed in the vicinity of the discharge opening of a glue dispensing apparatus and connected in an electric sensing and control or monitoring circuit.

1 Claim, 1 Drawing Figure

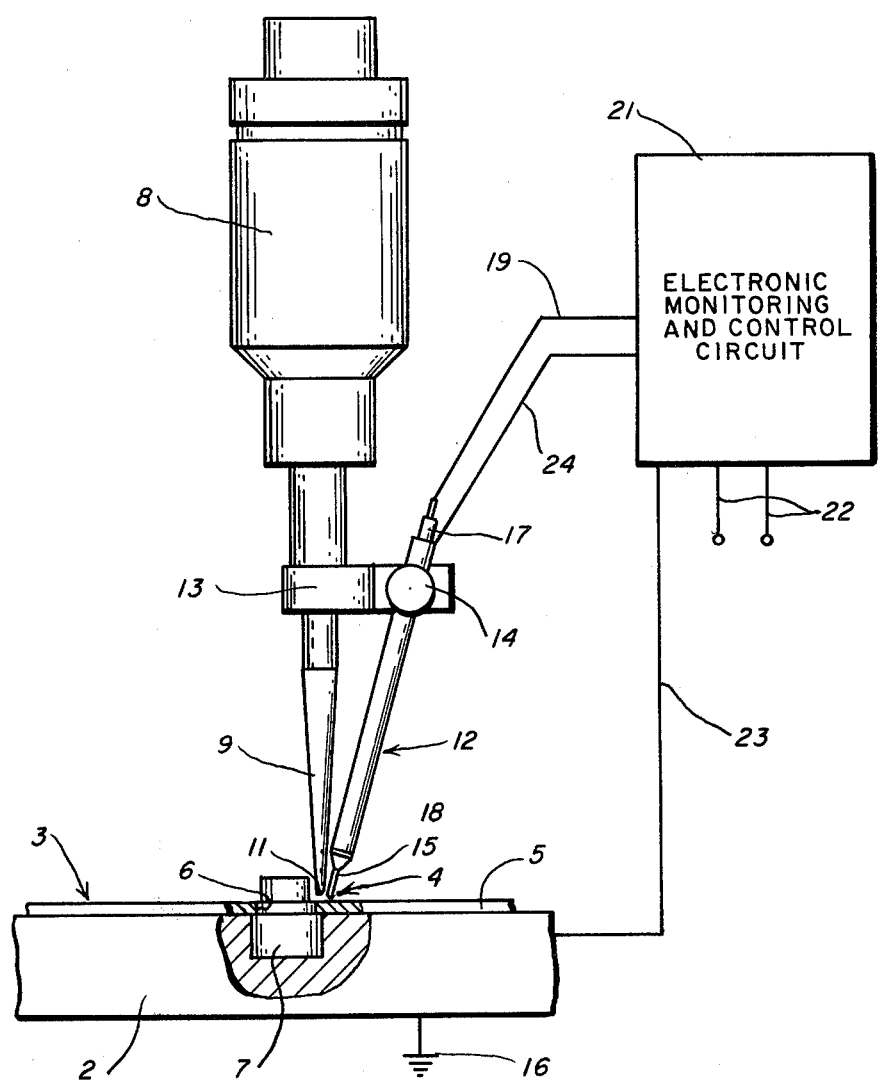
Fig_1

APPARATUS FOR MONITORING DISPENSATION OF GLUE IN AN AUTOMATIC GLUEING MACHINE

This invention related to apparatus for monitoring the application of workpiece joining adhesive at a workstation to which workpieces are serially automatically transported for joining; more particularly it relates to monitoring apparatus having circuit means including a probe for detecting the discharge of glue at the workstation and for disabling the workpiece transport means if no discharge has been detected within a predetermined interval.

More and more often, workpieces which must be joined together are being glued to each other. For cost-cutting reasons, the glueing operation takes place automatically in a machine. For instance, machines are known which contain a turntable. The parts to be glued together are placed in suitable seats in this turntable. Liquid glue which automatically distributes itself over the area to be glued is fed in. Subsequently, the turntable turns and the next workpiece arrives at the glueing area. A disadvantage of these devices is that there is no exact control as to whether glue has actually gotten to the glueing area. For example, if the glue dispensing apparatus is running or has run out of glue, the turntable would continue turning without the desired glueing operations taking place.

In accordance with the invention, circuit means including a probe is provided wherein the probe is positioned adjacent the discharge opening of a glue dispenser and above the workpiece areas to be joined. Each discharge of glue closes a circuit between the probe and ground and generates a pulse which enables the automatic transport of subsequent workpieces to the workstation to continue. The absence of a pulse for a predetermined period of time causes the transport of workpieces to shut down. Thus the absence of glue at the workstation sensed by the probe makes certain that the transport means, such as a turntable, is no longer indexed forward and/or an acoustic or optical signal is given. Thus the operator knows that the feeding of glue to a certain workpiece has not taken place properly. The circuit means can be adjustably set to shut down the transport means after preset times have elapsed following the last pulse generation. This makes possible a more universal application of the device as a function of the workpieces to be glued. The circuit is expediently designed so that it detects and likewise cuts out or gives a signal in the event of shortcircuits between the feeler and the workpiece also. This makes for greater reliability of the device.

An object of the invention to provide a device which exerts an automatic control over transport means feeding workpieces to a glueing workstation.

A further object of the invention is in the provision of circuit means for detecting the discharge of glue at a workstation and for signalling workpiece transport means to continue positioning workpieces at a workstation.

Other objects and many of attendant advantages of this invention will be readily appreciated as the same becomes better understood by reference to the following detailed description when considered in connection with the accompanying drawing wherein:

The single FIG. 1 is a view of the monitoring and control apparatus in accordance with the invention shown in association with apparatus for serially automatically transporting workpieces to be joined to a workstation.

Referring now to FIG. 1 there is shown a transport means 2 in which workpieces generally designated by reference numeral 3 to be glued are seated. The transport means 2 preferably comprises a motor driven turntable which is indexed to position successive workpieces 3 at a workstation generally designated by reference manual numeral 4 after each glueing operation. As shown the workpieces 3 may consist of a lever 5 with a hole 6 in which a bearing bushing 7 is to be glued. It goes without saying that the device is not limited to such parts, but can also be successfully applied to other workpieces 3. A glue dispenser apparatus 8, known per se is supported above the workstation 4 and contains a certain supply of glue, which is automatically fed at timed intervals to the workstation area in the required or measured amount through a tube 9 having a discharge opening 11 above the workpieces 3.

A probe assembly generally designated by reference numeral 12 is adjustably fastened to the glue dispensing apparatus 8 by means of a clamp 13 above the workstation 4. Both the height and angle of inclination of the probe assembly 12 are adjustable by means of a clamping screw 14. The probe assembly 12 consists of a probe 15 which is disposed so as to be wetted and electrically connected by the glue discharged from the tube opening 11 bridging the probe 15 and workpieces 3 which rest on the turntable 2 which is connected to ground 16. The probe 11 is mounted in an insulating sleeve 17 which is mounted within a retaining tube 18. An electric lead 19 connects the probe 15 to an electronic monitoring and control circuit 21 which is connected to a power supply (not shown) via lines 22. Another line 23 connects the electronic circuit 21 to control indexing of the transport means 2, i.e., the turntable 2 in the embodiment shown. In special cases it may be necessary to shield the probe 15 to avoid interference with other apparatus. This purpose is served by another line 24 which connects the retaining tube 18 and the electronic circuit 21.

In operation a number of workpieces 3 are loosely placed on the turntable transport 2 for serial presentation at the workstation 4. When workpieces 3 have arrived under the tube opening 11 of the glue dispenser apparatus 8, a measured amount of glue is fed to the gluing area of the workpieces 3 to be joined. In this process the probe 15 of the assembly 12 is wetted by the measured amount of glue which before levelling out bridges the probe 15 and workpieces 3 so that the circuit between the probe 15 and the workpieces 3 and, hence, the turntable transport is closed. The circuit 21 thus detects the resistance of the glue, which can be interpreted in the electronic circuit 15 by a so called window discriminator, for example. The consequence thereof, is that the turntable 2 is indexed forward so that the next workpieces 3 to be glued arrive at the workstation 4. If a measured amount of glue fails to be discharged for whatever reason, no new pulse is transmitted to the electronic circuit 21 within a predetermined time unit. Consequently, the turntable transport 2 is not indexed forward. If necessary, this may be indicated by an acoustic and/or optical signal to alert an operator who can remedy the cause of the breakdown.

If the probe 15 of the assembly 12 is moved through vibration or improper operation of the device, a short-circuit between the probe 15 and the workpieces for turntable 2 may occur. This is likewise detected by the circuit 21 which sees to it that the indexing of the turntable 1 is discontinued. The electronic circuit 21 preferably is adjustable so that the time unit within which the next pulse generated by discharge of a measured amount of glue must be transmitted is settable. This makes it possible to adjust the device readily to different workpieces.

The invention claimed is:

1. In combination with apparatus for applying measured amounts of glue for joining workpieces at a grounded workstation, including transport means for serially moving workpieces to be joined to said workstation,
- a glue dispenser positioned at said workstation having a discharge opening positioned above workpieces at said workstation to be joined,
- a conductive probe positioned adjacent said discharge opening of said glue dispenser and above workpieces at said workstation so as to be momentarily connected to ground by each measured amount of glue discharged, and circuit means connected between said probe and ground, said circuit means generating a pulse for enabling said transport means when a measured amount of glue has been discharged and momentarily bridges said probe and ground, and said circuit means disabling said transport means if a measured amount of glue has not been discharged within a predetermined time.

* * * * *